US012762964B2

(12) United States Patent
(10) Patent No.: US 12,762,964 B2
(45) Date of Patent: Oct. 13, 2026

Morris et al.

(54) REDUCTION OF FUEL USE BY AIRCRAFT

(71) Applicant: Gulfstream Aerospace Corporation, Savannah, GA (US)

(72) Inventors: Bryan Morris, Savannah, GA (US); Mauro Robbe, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 0 days.

(21) Appl. No.: 19/071,416

(22) Filed: Mar. 5, 2025

(65) Prior Publication Data

US 2026/0268779 A1 Sep. 10, 2026

(51) Int. Cl.
*G08G 5/34* (2025.01)
*G05D 1/644* (2024.01)
*G08G 5/76* (2025.01)

(52) U.S. Cl.
CPC ................ *G08G 5/34* (2025.01); *G08G 5/76* (2025.01); *G05D 1/644* (2024.01)

(58) Field of Classification Search
CPC ............. G08G 5/34; G08G 5/76; G05D 1/644
See application file for complete search history.

(56) References Cited

U.S. PATENT DOCUMENTS

| | | | | |
|---|---|---|---|---|
| 2010/0198433 | A1 | 8/2010 | Fortier et al. | |
| 2016/0103579 | A1* | 4/2016 | Coulmeau | G06F 3/0488 701/533 |
| 2017/0092136 | A1 | 3/2017 | Agrawal | |
| 2017/0249849 | A1 | 8/2017 | De Prins et al. | |

* cited by examiner

*Primary Examiner* — Long T Tran
*Assistant Examiner* — Charles J Brauch
(74) *Attorney, Agent, or Firm* — Ingrassia Fisher & Lorenz, LLP

(57) ABSTRACT

A method for reducing fuel use by aircraft includes piloting the aircraft along a current path including a scheduled arrival time; measuring actual wind conditions experienced by the aircraft at a current location, including wind direction and speed; calculating current expected fuel consumption based on the actual conditions, the scheduled arrival time, and the planned distance; obtaining a measured condition from another aircraft, including wind direction and speed; providing the measured condition to the processor; calculating for each location in a group of possible locations, a plurality of modified paths to the destination, wherein each includes a respective location and a modified distance, and the scheduled arrival time; calculating for each modified path, a modified expected fuel consumption based on the respective condition and modified distance, and the scheduled arrival time; and identifying a preferred path based on the current expected fuel consumption and the modified expected fuel consumptions.

20 Claims, 3 Drawing Sheets

REDUCTION OF FUEL USE BY AIRCRAFT

TECHNICAL FIELD

The technical field relates generally to flight conditions, and more particularly relates to a system and method that monitors and compares flight conditions in the vicinity of a flight path to identify a revised flight path that reduces fuel use.

BACKGROUND

The price of aircraft fuel has continuously increased in recent years. Nowadays, escalating fuel cost represents a big challenge to keeping commercial aviation competitive with other transportation alternatives. The aviation community therefore has been looking for ways to reduce aircraft fuel consumption.

Accordingly, it is desirable to provide methods and systems for reducing fuel consumption by aircraft by obtaining actual weather and wind conditions in the vicinity of the aircraft, and determine a best route for reducing fuel consumption, i.e., reducing headwinds or increasing tailwinds. Furthermore, other desirable features and characteristics of the various embodiments described herein will become apparent from the subsequent detailed description and the appended claims, taken in conjunction with the accompanying drawings and this background.

SUMMARY

Various non-limiting embodiments of methods and systems for reducing fuel use by aircraft are provided.

In a first non-limiting embodiment, a method for reducing fuel use by an aircraft includes piloting the aircraft along a current flight path to a destination, wherein the current flight path includes a scheduled arrival time and a planned distance; measuring an actual wind condition experienced by the aircraft at a current location, including wind direction and wind speed; calculating, via a processor a current expected fuel consumption based on the actual wind conditions, the scheduled arrival time, and the planned distance; obtaining a measured wind condition from another aircraft, including a wind direction and a wind speed; providing the measured wind condition to the processor; calculating, via the processor, for each location in a group of possible locations, a plurality of modified flight paths to the destination, wherein each modified flight path includes a respective location and a modified distance, and the scheduled arrival time; calculating, via the processor, for each modified flight path, a modified expected fuel consumption based on the respective wind condition and modified distance, and the scheduled arrival time; and identifying, via the processor, a preferred flight path based on the current expected fuel consumption and the modified expected fuel consumptions; and when the preferred flight path is not the current flight path, communicating, via the processor, a signal to an operator of the aircraft.

In certain embodiments of the method, communicating the signal to the operator of the aircraft includes communicating, via the processor, a message to a pilot, and the method further includes piloting the aircraft along modified flight path.

In certain embodiments of the method, communicating the signal to the operator of the aircraft includes communicating, via the processor, an instruction to an autopilot module, and the method further includes piloting the aircraft along modified flight path.

In certain embodiments, the method further includes removing from the group of possible locations each location associated with a measured wind condition from a time earlier than a threshold time period.

In certain embodiments, the method further includes removing from the group of possible locations each location located at a distance from the aircraft greater than a threshold distance.

In certain embodiments, the method further includes removing each location associated with a measured wind condition from a time earlier than a threshold time period from the group of possible locations.

In certain embodiments, the method further includes obtaining reports of turbulence from other aircraft at turbulent locations within the vicinity of the aircraft; providing the reports of turbulence to the processor; and removing the turbulent locations from the group of possible locations.

In certain embodiments, the method further includes obtaining measured humidity and temperature data from other aircraft at the locations within the vicinity of the aircraft; providing the measured humidity and temperature data to the processor; determining, via the processor, that contrails are likely to form at certain locations based the measured humidity and temperature data; and removing the certain locations from the group of possible locations.

In certain embodiments of the method, calculating, for each location in the group of possible locations, a modified flight path to the destination and calculating, for each modified flight path, a modified expected fuel consumption includes: calculating a heading of each location; calculating a headwind for each location; calculating a distance matrix from each location to each location; calculating a direction matrix from each location to each location; calculating an altitude difference matrix from each location to each location; calculating a time difference matrix from each location to each location; calculating a headwind matrix from each location to each location; and calculating a headwind benefit from each location to each location.

In certain embodiments of the method, the current expected fuel consumption is calculated based on a current altitude on the current flight path; and the modified expected fuel consumption is calculated based on modified altitude on the modified flight path.

In another non-limiting embodiment, a system for reducing fuel use by an aircraft includes one or more sensors configured to measure an actual wind condition, including wind direction and wind speed, at the aircraft at a current location along a current flight path to a destination, wherein the current flight path includes a scheduled arrival time and a planned distance; a processor coupled to the one or more sensors, and configured to at least facilitate: calculating a current expected fuel consumption based on the actual wind conditions, the scheduled arrival time, and the planned distance; obtaining measured wind conditions from other aircraft, including wind directions and wind speeds; calculating for each location in a group of possible locations, a modified flight path to the destination, wherein each modified flight path includes a respective location and modified distance, and the scheduled arrival time; calculating for each modified flight path, a modified expected fuel consumption based on the respective wind condition and modified distance, and the scheduled arrival time; and identifying a preferred flight path based on the current expected fuel consumption and the modified expected fuel consumptions;

and communicating a signal to an operator of the aircraft when the preferred flight path is not the current flight path.

In certain embodiments of the system, the processor is configured to communicate a message to a pilot.

In certain embodiments of the system, the processor is configured to communicate an instruction to an autopilot module configured to pilot the aircraft along modified flight path.

In certain embodiments of the system, the processor is configured to remove from the group of possible locations each location associated with a measured wind condition from a time earlier than a threshold time period and to remove from the group of possible locations each location located at a distance from the aircraft greater than a threshold distance.

In certain embodiments of the system, the processor is configured to obtain reports of turbulence from other aircraft at turbulent locations within the vicinity of the aircraft; and to remove the turbulent locations from the group of possible locations.

In certain embodiments of the system, the processor is configured to obtain measured humidity and temperature data from other aircraft at the locations within the vicinity of the aircraft; to determine that contrails are likely to form at certain locations based the measured humidity and temperature data; and to determine remove the certain locations from the group of possible locations.

In certain embodiments of the system, the processor is configured to facilitate: calculating a heading of each location; calculating a headwind for each location; calculating a distance matrix from each location to each location; calculating a direction matrix from each location to each location; calculating an altitude difference matrix from each location to each location; calculating a time difference matrix from each location to each location; calculating a headwind matrix from each location to each location; and calculating a headwind benefit from each location to each location.

In another non-limiting embodiment, an aircraft includes one or more sensors configured to measure an actual wind condition, including wind direction and wind speed, at the aircraft at a current location along a current flight path to a destination, wherein the current flight path includes a scheduled arrival time and a planned distance; a processor coupled to the one or more sensors, and configured to at least facilitate: calculating a current expected fuel consumption based on the actual wind conditions, the scheduled arrival time, and the planned distance; obtaining measured wind conditions from other aircraft, including wind directions and wind speeds; calculating for each location in a group of possible locations, a modified flight path to the destination, wherein each modified flight path includes a respective location and modified distance, and the scheduled arrival time; calculating for each modified flight path, a modified expected fuel consumption based on the respective wind condition and modified distance, and the scheduled arrival time; and identifying a preferred flight path based on the current expected fuel consumption and the modified expected fuel consumptions; and communicating a signal to an operator of the aircraft when the preferred flight path is not the current flight path.

In certain embodiments of the aircraft, the processor is configured to facilitate: obtaining reports of turbulence from other aircraft at turbulent locations within the vicinity of the aircraft; and removing the turbulent locations from the group of possible locations.

In certain embodiments of the aircraft, the processor is configured to facilitate: obtaining measured humidity and temperature data from other aircraft at the locations within the vicinity of the aircraft; determining, via the processor, that contrails are likely to form at certain locations based the measured humidity and temperature data; and removing the certain locations from the group of possible locations.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
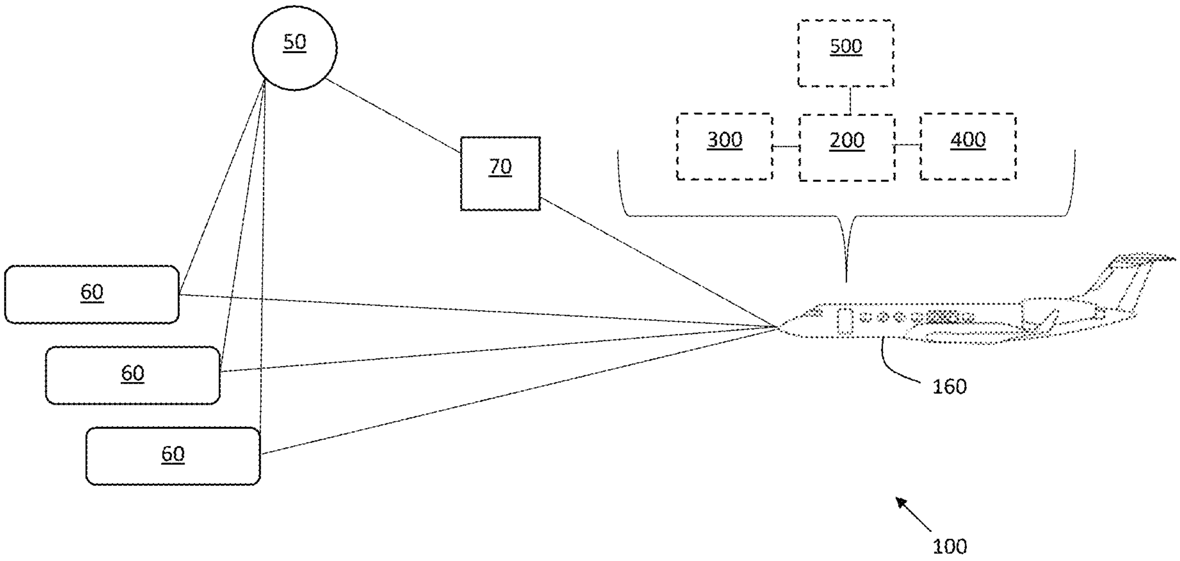
FIG. 1 is a simplified schematic illustrating a system for reducing fuel consumption by an aircraft in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Certain embodiments herein provide for reducing fuel consumption by an aircraft in flight through the use of real, actual reported weather conditions or atmospheric conditions, rather than forecast or predicted weather conditions or atmospheric conditions. Specifically, fuel consumption may be reduced by modifying the aircraft's flight path to a flight path with more favorable weather conditions. With a reduction in fuel consumption, carbon emissions from the aircraft are also reduced.

In certain embodiments, the weather conditions are measured and reported by other aircraft. In other embodiments, the weather conditions are measured by satellites, such as real time satellite data provided for various altitudes.

For example, reports of reduced headwinds or increased tailwinds may be received from another aircraft in the forward vicinity of the current flight path, such as at a higher or lower identified altitude or location. In embodiments herein, a fuel savings resulting from changing the flight path to the identified altitude or location may be identified or calculated, and a signal may be communicated to the aircraft including an instruction to modify the flight path to take advantage of the favorable flight conditions. As a result, the aircraft may reduce its power and fuel consumption while maintaining the original arrival time at its destination.

In certain embodiments, the benefits of the reduced headwinds or increased tailwinds are weighed against the increased amount of fuel required to move the aircraft to the identified altitude or location. When the amount of fuel saved by the reduction in fuel consumption at the identified altitude or location is not greater than the amount fuel used to move the aircraft to the identified altitude or location, then the system or method does not recommend modifying the flight path.

Certain embodiments may provide additional or alternative benefits.

For example, in certain embodiments, reports of turbulence by other aircraft in the vicinity of the current flight path may be monitored and the flight path may be modified to reduce instances of flight turbulence for the aircraft.

In other embodiments, reported measurements of humidity and temperature may be received from another aircraft in the vicinity of the current flight path. In embodiments herein, the likelihood of forming contrails may be calculated from the humidity and temperature, as well as other factors based on the aircraft. Therefore, embodiments herein may identify altitudes or locations on or in the vicinity of the flight path where contrails are more likely or less likely to be formed from the exhaust of the aircraft. Certain embodiments herein may modify a flight path to avoid altitudes or locations where contrails are more likely to be formed. Certain embodiments herein may modify a flight path to move the aircraft to altitudes or locations where contrails are less likely to be formed.

In certain embodiments, the system may assign a value representing the relevancy of a report from an aircraft and evaluate all reports received to determine whether to modify a flight path. For example, a report from one half hour prior at a location fifty nautical miles ahead of the aircraft may be provided with a higher relevancy value than a report from one hour prior at a location one hundred nautical miles lateral to the aircraft. Lower value reports may be ignored or provided with less weight as compared to higher value reports. For example, reports from greater than a threshold distance away, such as five hundred nautical miles away, may be completely ignored. Likewise, reports from greater than a threshold amount of time, such as an hour ago, may be completely ignored. The threshold amount of time may be relatively long as air streams at commonly traveled altitudes are persistent and can be expected to remain the same or only change slightly with the amount of time it would take for the aircraft to reach the location of a weather report from another aircraft.

In certain embodiments, reports of weather conditions and locations may be received directly from the other aircraft. Alternatively, such reports may be received from a data warehouse, server, or other module provided for collecting and aggregating data from aircraft. For example, the other aircraft may transmit weather and location information to a satellite or satellites. The weather and location information may be communicated from the satellite or satellites to a data server. In certain embodiments herein, the aircraft obtains the weather and location information directly from the data server. In other embodiments, a centralized control module may obtain the weather and location information directly from the data server and forward relevant weather and location information directly to the aircraft. In still other embodiments, a centralized control module may obtain the weather and location information directly from the data server, perform the analysis for determining whether an aircraft's flight path should be modified, and communicate a directive or instruction to the aircraft when a flight modification will lead to reduced fuel consumption.

It is noted that the other aircraft located ahead of the primary aircraft may be traveling in the same general direction as the primary aircraft, may be traveling toward the primary aircraft, or may be traveling across the flight path of the primary aircraft. In other words, embodiments are not limited to only receiving data from other aircraft flying in a same general route.

Embodiments herein may include retaining the scheduled arrival time at the aircraft's destination despite any modifications to the flight path.

It has been determined that for certain aircraft, a 40-knot wind assistance generates an 8.6% fuel savings when cruising at 45K/0.9M (500 knots ground speed). For example, with zero wind, the fuel burn at 500 knots ground speed is 500*0.0924=46.2 lb/m. Flying at 500 knots ground speed with a 40-knot wind assistance, the fuel benefit is 500*0.0002*−40=−4 lb/m; and −4/46.2=−8.6%.

It is noted that, for constant ground speed, aircraft burn more fuel at lower altitudes as compared to higher altitudes. Thus, climbing to a higher altitude to gain a wind benefit will always result in more fuel savings than the wind benefit fuel savings alone, while descending to a lower altitude to gain a wind benefit will always result in less fuel savings than the wind benefit fuel savings alone.

Embodiments herein consider the effect of additional fuel consumption at the lower altitude for a constant ground speed when calculating fuel savings. The table below shows the go/no-go decision matrix for a 60,000 lb gross weight aircraft traveling at an altitude of 45000 ft and speed of 0.90 Mach. A negative % change in fuel consumption indicates that a change to obtain the wind benefit would be beneficial despite a change to a lower altitude.

| % change in fuel consumption | | | | | | |
|---|---|---|---|---|---|---|
| | Wind benefit | | | | | |
| Altitude | 0 kn | 20 kn | 40 kn | 60 kn | 80 kn | 100 kn |
| 45000 | 0.0% | −4.3% | −8.7% | −13.0% | −17.3% | −21.6% |
| 43000 | 2.2% | −2.1% | −6.4% | −10.8% | −15.1% | −19.4% |
| 41000 | 7.2% | 2.8% | −1.5% | −5.8% | −10.1% | −14.5% |
| 39000 | 13.8% | 9.4% | 5.1% | 0.8% | −3.6% | −7.9% |
| 37000 | 20.9% | 16.6% | 12.3% | 7.9% | 3.6% | −0.7% |

In an example, an aircraft is flying from a flight origin to a flight destination. While in flight, the aircraft receives reports of flight conditions from other aircraft at forward locations in the vicinity of the aircraft.

In the example, while the aircraft is flying at an altitude of 35,000 feet with a tailwind of 10 knots, the aircraft receives a report from another aircraft located along the same flight path but at an altitude of 38,000 feet which reports a stronger tailwind of 50 knots. The system calculates the amount of fuel that would be consumed while remaining on the current flight path at 35,000 feet and calculates the amount of fuel that would be consumed by the aircraft in flight at 38,000 feet with the same arrival time, based on the respective tailwinds. Further, the system calculates the amount of fuel that would be consumed while moving the aircraft from 35,000 to 38,000 feet. When the total amount of fuel needed to complete the modified flight path is less than the total amount of fuel needed to complete the original flight path, the system communicates a signal to modify the flight path to move to 38,000 feet altitude. Such signal may be an automatic directive to the aircraft or a communication to the pilot, suggesting a flight path modification.

While this example illustrates a situation in which winds are different at a different altitude, it is also contemplated that the winds may be different at a location in the same altitude but distanced at an angle to a side of the original or current flight path, or at a different altitude and distanced at an angle to a side of the original or current flight path.

In certain embodiments, a pilot may request a mode of flight which avoids all turbulence, such as during typical sleeping hours of the passengers.

At other times, a pilot may request a mode of flight that avoids all turbulence greater than a threshold value. Eddy dissipation rate (EDR) is the official atmospheric turbulence intensity metric for the International Civil Aviation Organization (ICAO) and the World Meteorological Organization (WMO), and is an objective, aircraft-independent, universal measure of turbulence based on the rate at which energy dissipates in the atmosphere. EDR values range from 0 to 1. The effect of a particular EDR value on an aircraft will depend on the size (weight) of the aircraft. The threshold EDR value may be set at any value between 0 and 1.

In certain embodiments, a pilot may request a flight mode that avoids certain levels of turbulence only if flight modifications do not cause an increase in fuel consumption over a threshold value.

Thus, the system and method provided herein may be adjusted to a user's desire to provide the desired benefits of reducing fuel consumption, avoiding or reducing occurrences of turbulence, and/or avoiding or reducing formation of contrails.

Figure 2:
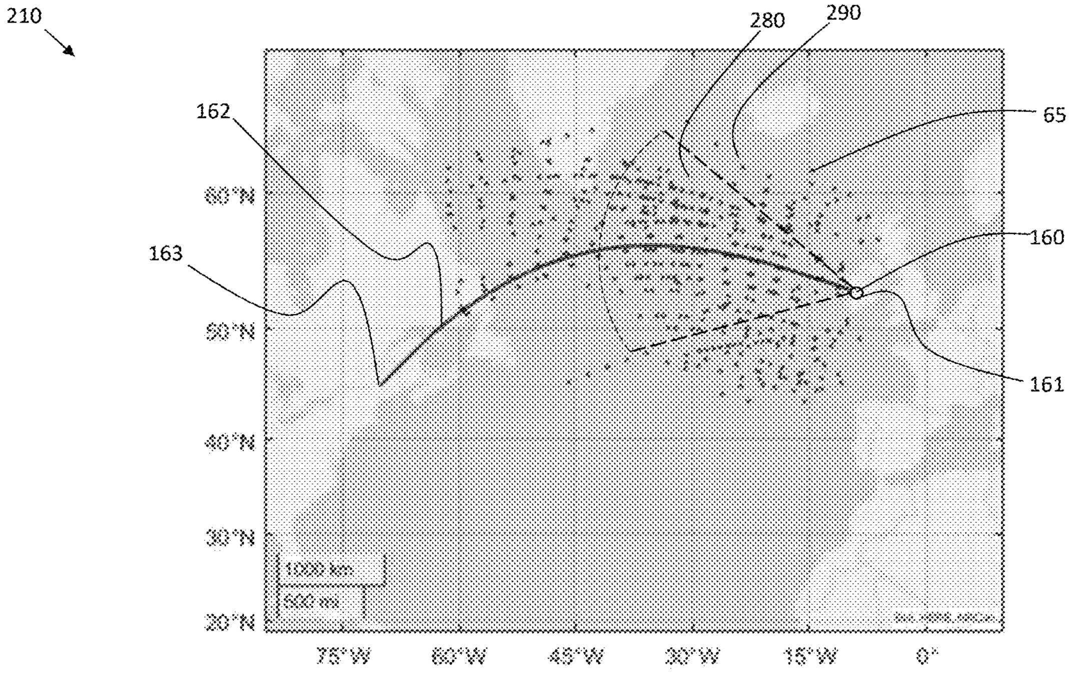
FIG. 2 is a map illustrating locations of measured weather conditions with respect to an aircraft traveling on a flight path in accordance with an exemplary embodiment.

FIG. 1 is a schematic plan view of a system 100 for reducing fuel use by an aircraft 160. FIG. 2 is a map 210 illustrating the weather and location data provided by other aircraft 60 and used by the system 100. For purposes of discussion, aircraft 160 is referred to as the primary aircraft 160 to distinguish it from the other aircraft 60.

FIG. 1 illustrates that the system 100 includes a processor or control module 200. The processor 200 may be located on the primary aircraft 160 or may communicate with the primary aircraft 160.

As shown, the system 100 further includes one or more sensors 300 located on the primary aircraft 160. Cross-referencing FIGS. 1 and 2, the sensors 300 are configured to measure actual weather conditions including wind conditions, such as wind direction and wind speed, as well as temperature and humidity and other conditions at the current location 161 of the primary aircraft 160 along a current flight path 162 to a destination 163, wherein the current flight path 161 includes a scheduled arrival time and a planned distance.

As further shown in FIG. 1, the system 100 also includes a communication module 400 which may be located on the primary aircraft 160. The communication module 400 provides for communication between the processor 200 and other aircraft 60, satellite 50, and/or a data server 70 in communication with satellite 50. It is noted that the satellite 50 may be a data transmission satellite or may be equipped to measure weather conditions and provide real time satellite data for various altitudes.

Cross-referencing FIGS. 1 and 2, the other aircraft 60 measure actual weather conditions (such as wind direction and wind speed, temperature, humidity, and other conditions), altitude, velocity, and direction, and communicate those measurements from measurement signal locations 65. For example, the other aircraft 60 may communicate those measurements directly to the primary aircraft 160. Alternatively, or additionally, the other aircraft 60 may communicate the measurements to the satellite 50. The satellite 50 may communicate the measurements to the primary aircraft 160. Such communication may be indirect. For example, as shown, the satellite 50 may communicate the measurements to data server 70, and the data server 70 may communicate the measurements to the primary aircraft 160. More specifically, the processor 200 may proactively access and retrieve measurements from the data server 70 through the communication module 400.

FIG. 2 illustrates a plurality of measurement signal locations 65 received from other aircraft 60 from their respective flight paths. The measurements may be communicated from the other aircraft 60 at a set frequency, such as every ten minutes, or continuously. In embodiments herein, the processor 200 may obtain measurements from all of the illustrated measurement signal locations 65.

The processor 200 is configured to identify from the measurement signal locations 65 the most relevant data and to determine a best mode of reducing fuel consumption. For example, the processor 200 may identity that certain measurement signal locations 65 are within the vicinity 280 of the primary aircraft 160 and that other measurement signal locations 65 are outside the vicinity 280, i.e., in a disregard region 290.

The vicinity 280 may be defined to include measurement signal locations 65 that are within a set degree to the left and the right of the heading of the primary aircraft 160, as shown. Further, the vicinity 280 may be defined to include measurement signal locations 65 that are within a set distance from the current location 161 of the primary aircraft 160 as shown.

Also, within the vicinity 280 the processor may apply a temporal limitation such that older measurement signal locations 65 from within the vicinity 280 may be ignored or devalued as compared to newer measurement signal locations 65. Further, the temporal limitation may be applied in conjunction with distance from the current location 161 of the primary aircraft 160, such that older measurement signal locations 65 closer to the current location 161 of the primary aircraft 160 may be provided with greater relevancy weight than older measurement signal locations 65 farther from the current location 161 of the primary aircraft 160.

After eliminating irrelevant measurement signal locations 65, processor 200 determines a best fuel reduction scenario provided by directing the primary aircraft 160 to one of the measurement signal locations 65 within the vicinity 280. When the best fuel reduction scenario provides fuel savings over the current flight path, the processor 200 modifies the flight path to a modified flight path through the preferred measurement signal location 65. The modified flight path includes the original destination 163 and original scheduled arrival time.

Figure 3:
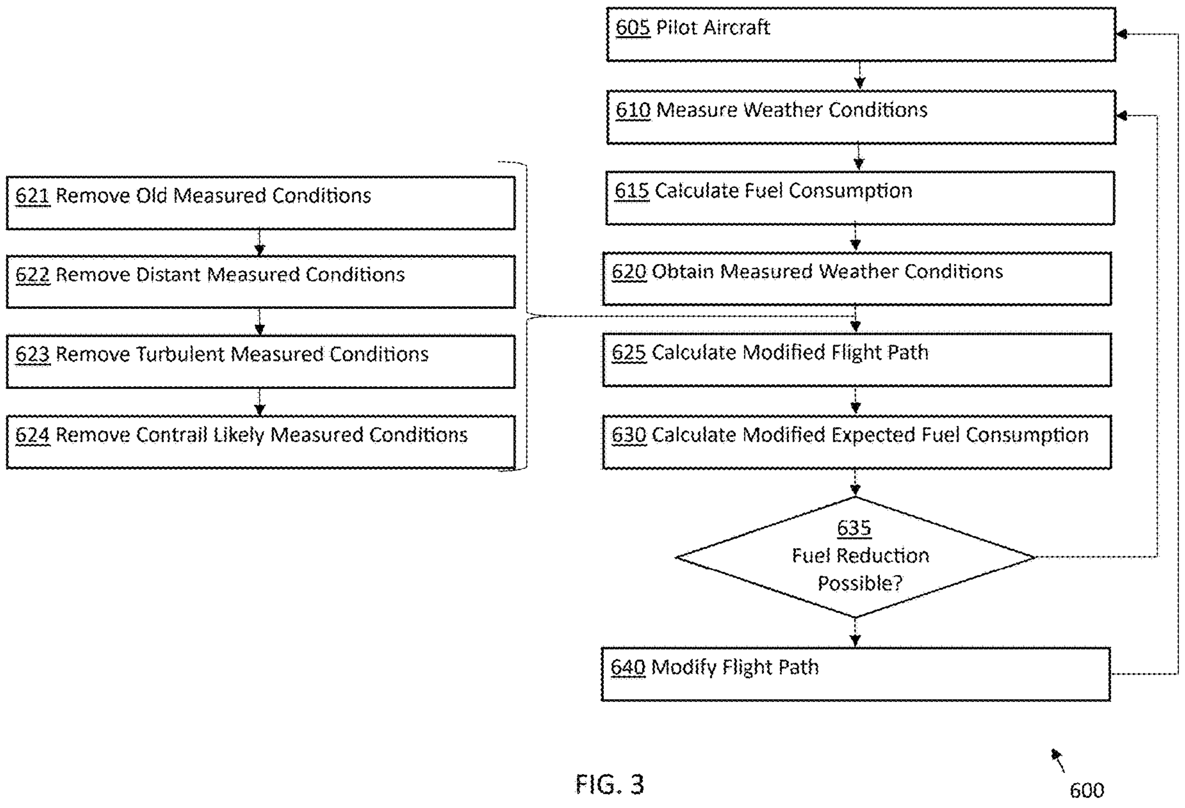
FIG. 3 is a flow chart illustrating a method for reducing fuel consumption by an aircraft in accordance with an exemplary embodiment.

FIG. 3 illustrates a method 600 for reducing fuel use by an aircraft 160. Method 600 includes, at operation 605, piloting the aircraft 160 along a current flight path 162 to a destination 163, wherein the current flight path includes a scheduled arrival time and a planned distance.

Method 600 may continue at operation 610, which includes measuring an actual weather condition experienced by the aircraft 160 at the current location 161, such as a wind condition including wind direction and wind speed.

Method 600 may continue at operation 615, where the processor 200 calculates a current expected fuel consumption based on the actual wind conditions, the scheduled arrival time, and the planned distance.

Method 600 may continue at operation 620, where the processor 200 obtains measured weather conditions from other aircraft 60, such as wind conditions including wind directions and wind speeds.

Method 600 may continue at operation 625, where the processor 200 calculates, for each location in a group of possible locations, a modified flight path to the destination, wherein each modified flight path includes a respective location and modified distance, and the scheduled arrival time.

Operation 625 may include:

calculating a heading of each location;

calculating a headwind for each location;

calculating a distance matrix from each location to each location;

calculating a direction matrix from each location to each location;

calculating an altitude difference matrix from each location to each location;

calculating a time difference matrix from each location to each location;

calculating a headwind matrix from each location to each location; and calculating a headwind benefit from each location to each location, i.e., a difference between current headwind and the possible headwind.

Method 600 may continue at operation 630, where the processor 200 calculates, for each modified flight path, a modified expected fuel consumption based on the respective wind condition and modified distance, and the scheduled arrival time.

It is noted that at operations 615 and 630, the processor calculates the current expected fuel consumption based on a current altitude on the current flight path; and the processor calculates the modified expected fuel consumption based on a modified altitude on the modified flight path.

Method 600 may continue at query 635, where the processor 200 queries whether fuel reduction is possible. Specifically, the processor may identify a preferred flight path based on the current expected fuel consumption and the modified expected fuel consumptions and determine whether the preferred flight path is the current flight path.

When the preferred flight path is the current flight path, method 600 continues at operation 610.

When the preferred flight path is not the current flight path, method 600 continue at operation 640, where the processor 200 communicates a signal to an operator of the aircraft to modify the flight path. Thereafter, method 600 may continue at operation 605.

Operation 640 may include communicating a message to a pilot, when the pilot is the operator of the aircraft, and method 600 may further include piloting the aircraft along modified flight path at operation 605 via the pilot.

Operation 640 may include communicating a message to an autopilot module when the autopilot module is the operator of the aircraft, and method 600 may further include piloting the aircraft along modified flight path at operation 605 via the autopilot module.

As shown, method 500 may include operation 621, where the processor removes from the group of possible locations each location associated with a measured wind condition from a time earlier than a threshold time period before calculating the modified flight paths at operation 625.

As shown, method 500 may include operation 622, where the processor removes from the group of possible locations each location located at a distance from the aircraft greater than a threshold distance before calculating the modified flight paths at operation 625.

In certain embodiments, the measured weather conditions obtained from other aircraft 60 at operation 610 includes reports of turbulence. In such embodiments, method may include operation 623, where the processor removes from the group of possible locations each location associated with a report of turbulence. Operation 623 may include evaluating the severity of turbulence such that only locations associated with reports of turbulence greater than a threshold value are removed at operation 623.

In certain embodiments, the measured weather conditions obtained from other aircraft 60 at operation 610 includes humidity, temperature, and other conditions that may impact the formation of contrails. In such embodiments, method may include operation 624, where the processor determines that contrails are likely to form at certain locations based the measured humidity and temperature data, and removes the certain locations wherein contrails are likely to form from the group of possible locations. Operation 624 may include evaluating the severity of contrails that are likely to form such that only locations associated with a likelihood of severe formation of contrails are removed at operation 624.

Thus, method 600 is provided for the processor to remove irrelevant results, leaving behind relevant altitude or heading change recommendations; eliminate comparisons between the same aircraft; eliminate low wind benefit points; eliminate far away points; eliminate points that are not in each aircraft's flight path; eliminate data points that are too old and data points that are in the future compared to the current point's timestamp; eliminate same altitude points; find the largest wind benefit, if any, for each aircraft's most recent data point; and report results.

In certain embodiments, the processor 200 is configured to at least facilitate: calculating a current expected fuel consumption based on the actual wind conditions, the scheduled arrival time, and the planned distance; obtaining measured wind conditions from other aircraft 60, including wind directions and wind speeds; calculating for each location in a group of possible locations, a modified flight path to the destination, wherein each modified flight path includes a respective location and modified distance, and the scheduled arrival time; calculating for each modified flight path, a modified expected fuel consumption based on the respective wind condition and modified distance, and the scheduled arrival time; and identifying a preferred flight path based on the current expected fuel consumption and the modified expected fuel consumptions; and communicating a signal to an operator of the aircraft when the preferred flight path is not the current flight path.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A method for reducing fuel use by an aircraft, the method comprising:

piloting the aircraft along a current flight path to a destination, wherein the current flight path includes a scheduled arrival time and a planned distance;

measuring an actual wind condition experienced by the aircraft at a current location, including wind direction and wind speed;

calculating, via a processor, a current expected fuel consumption based on the actual wind conditions, the scheduled arrival time, and the planned distance;

obtaining a measured wind condition from another aircraft, including a wind direction and a wind speed;

providing the measured wind condition to the processor;

calculating, via the processor, for each location in a group of possible locations, a plurality of modified flight paths to the destination, wherein each modified flight path includes a respective location and a modified distance, and the scheduled arrival time;

calculating, via the processor, for each modified flight path, a modified expected fuel consumption based on the respective wind condition and modified distance, and the scheduled arrival time; and identifying, via the processor, a preferred flight path based on the current expected fuel consumption and the modified expected fuel consumptions; and when the preferred flight path is not the current flight path, communicating, via the processor, a signal to an operator of the aircraft.

2. The method of claim 1, wherein communicating the signal to the operator of the aircraft comprises communicating, via the processor, a message to a pilot, and wherein the method further comprises piloting the aircraft along the modified flight path.

3. The method of claim 1, wherein communicating the signal to the operator of the aircraft comprises communicating, via the processor, an instruction to an autopilot module, and wherein the method further comprises piloting the aircraft along the modified flight path.

4. The method of claim 1, further comprising removing from the group of possible locations each location associated with a measured wind condition from a time earlier than a threshold time period.

5. The method of claim 1, further comprising removing from the group of possible locations each location located at a distance from the aircraft greater than a threshold distance.

6. The method of claim 5, further comprising removing each location associated with a measured wind condition from a time earlier than a threshold time period from the group of possible locations.

7. The method of claim 1, further comprising:

obtaining reports of turbulence from other aircraft at turbulent locations within the vicinity of the aircraft;

providing the reports of turbulence to the processor; and removing the turbulent locations from the group of possible locations.

8. The method of claim 1, further comprising:

obtaining measured humidity and temperature data from other aircraft at the locations within the vicinity of the aircraft;

providing the measured humidity and temperature data to the processor;

determining, via the processor, that contrails are likely to form at certain locations based the measured humidity and temperature data; and removing the certain locations from the group of possible locations.

9. The method of claim 1, wherein calculating, for each location in the group of possible locations, a modified flight path to the destination and calculating, for each modified flight path, a modified expected fuel consumption comprises:

calculating a heading of each location;

calculating a headwind for each location;

calculating a distance matrix from each location to each location;

calculating a direction matrix from each location to each location;

calculating an altitude difference matrix from each location to each location;

calculating a time difference matrix from each location to each location;

calculating a headwind matrix from each location to each location; and calculating a headwind benefit from each location to each location.

10. The method of claim 1, wherein:

the current expected fuel consumption is calculated based on a current altitude on the current flight path; and the modified expected fuel consumption is calculated based on modified altitude on the modified flight path.

11. A system for reducing fuel use by an aircraft, the system comprising:

one or more sensors configured to measure an actual wind condition, including wind direction and wind speed, at the aircraft at a current location along a current flight path to a destination, wherein the current flight path includes a scheduled arrival time and a planned distance;

a processor coupled to the one or more sensors, and configured to facilitate:

calculating a current expected fuel consumption based on the actual wind conditions, the scheduled arrival time, and the planned distance;

obtaining measured wind conditions from other aircraft, including wind directions and wind speeds;

calculating for each location in a group of possible locations, a modified flight path to the destination, wherein each modified flight path includes a respective location and modified distance, and the scheduled arrival time;

calculating for each modified flight path, a modified expected fuel consumption based on the respective wind condition and modified distance, and the scheduled arrival time; and identifying a preferred flight path based on the current expected fuel consumption and the modified expected fuel consumptions; and communicating a signal to an operator of the aircraft when the preferred flight path is not the current flight path.

12. The system of claim 11, wherein the processor is configured to communicate a message to a pilot.

13. The system of claim 11, wherein the processor is configured to communicate an instruction to an autopilot module configured to pilot the aircraft along modified flight path.

14. The system of claim 11, wherein the processor is configured to remove from the group of possible locations each location associated with a measured wind condition from a time earlier than a threshold time period and to remove from the group of possible locations each location located at a distance from the aircraft greater than a threshold distance.

15. The system of claim 11, wherein the processor is configured to obtain reports of turbulence from other aircraft at turbulent locations within the vicinity of the aircraft; and to remove the turbulent locations from the group of possible locations.

16. The system of claim 11, wherein the processor is configured to obtain measured humidity and temperature data from other aircraft at the locations within the vicinity of the aircraft; to determine that contrails are likely to form at certain locations based the measured humidity and temperature data; and to determine remove the certain locations from the group of possible locations.

17. The system of claim 11, wherein the processor is configured to facilitate:

calculating a heading of each location;

calculating a headwind for each location;

calculating a distance matrix from each location to each location;

calculating a direction matrix from each location to each location;

calculating an altitude difference matrix from each location to each location;

calculating a time difference matrix from each location to each location;

calculating a headwind matrix from each location to each location; and calculating a headwind benefit from each location to each location.

18. An aircraft comprising:

one or more sensors configured to measure an actual wind condition, including wind direction and wind speed, at the aircraft at a current location along a current flight path to a destination, wherein the current flight path includes a scheduled arrival time and a planned distance;

a processor coupled to the one or more sensors, and configured to at least facilitate:

calculating a current expected fuel consumption based on the actual wind conditions, the scheduled arrival time, and the planned distance;

obtaining measured wind conditions from other aircraft, including wind directions and wind speeds;

calculating for each location in a group of possible locations, a modified flight path to the destination, wherein each modified flight path includes a respective location and modified distance, and the scheduled arrival time;

calculating for each modified flight path, a modified expected fuel consumption based on the respective wind condition and modified distance, and the scheduled arrival time; and identifying a preferred flight path based on the current expected fuel consumption and the modified expected fuel consumptions; and communicating a signal to an operator of the aircraft when the preferred flight path is not the current flight path.

19. The aircraft of claim 18, wherein the processor is configured to facilitate:

obtaining reports of turbulence from other aircraft at turbulent locations within the vicinity of the aircraft; and removing the turbulent locations from the group of possible locations.

20. The aircraft of claim 18, wherein the processor is configured to facilitate:

obtaining measured humidity and temperature data from other aircraft at the locations within the vicinity of the aircraft;

determining, via the processor, that contrails are likely to form at certain locations based the measured humidity and temperature data; and removing the certain locations from the group of possible locations.

* * * * *